United States Patent
Böhm

(10) Patent No.: US 11,988,499 B2
(45) Date of Patent: May 21, 2024

(54) THz MEASURING DEVICE AND THz MEASURING METHOD FOR DETERMINING A LAYER THICKNESS OR A DISTANCE OF A MEASUREMENT OBJECT

(71) Applicant: CiTEX Holding GmbH, Melle (DE)

(72) Inventor: Roland Böhm, Altenberge (DE)

(73) Assignee: CiTEX Holding GmbH, Melle (DE)

( * ) Notice: Subject to any disclaimer, the term of this patent is extended or adjusted under 35 U.S.C. 154(b) by 353 days.

(21) Appl. No.: 17/440,459

(22) PCT Filed: Mar. 13, 2020

(86) PCT No.: PCT/DE2020/100188
§ 371 (c)(1),
(2) Date: Sep. 17, 2021

(87) PCT Pub. No.: WO2020/200360
PCT Pub. Date: Oct. 8, 2020

(65) Prior Publication Data
US 2022/0146251 A1    May 12, 2022

(30) Foreign Application Priority Data

Mar. 29, 2019   (DE) .................. 10 2019 108 299.4

(51) Int. Cl.
*G01B 11/06* (2006.01)
*G01N 21/3563* (2014.01)
*G01N 21/3581* (2014.01)

(52) U.S. Cl.
CPC .......... *G01B 11/0691* (2013.01); *G01B 11/06* (2013.01); *G01N 21/3563* (2013.01); *G01N 21/3581* (2013.01)

(58) Field of Classification Search
CPC ... G01B 11/0691; G01B 11/06; G01B 11/026; G01B 11/10; G01B 11/245; G01B 11/27;
(Continued)

(56) References Cited

U.S. PATENT DOCUMENTS 7,345,279 B2 *  3/2008  Mueller ............. G01N 21/3581
                                                       250/341.1
8,783,874 B1    7/2014  Riza

FOREIGN PATENT DOCUMENTS

DE    102007011704    9/2008
DE    102013223945    5/2015
(Continued)

OTHER PUBLICATIONS

International Search Report and Written Opinion for PCT/DE2020/100188 dated Jul. 8, 2020.
(Continued)

*Primary Examiner* — Md M Rahman
(74) *Attorney, Agent, or Firm* — Barnes & Thornburg LLP

(57) ABSTRACT

The invention relates to a THz measuring device for measuring a layer thickness of a wall (4a) of a measurement object (4) and/or of a distance (18) between boundary surfaces (4a, 4b) of a measurement object (4), comprising a transmitter and receiver unit (2) including a Terahertz-Sender and a Terahertz receiver, a controller means configured to determine the layer thickness of the wall (4a) of the measurement object (4) and/or a distance (18) between boundary surfaces (4b, 4c) of the measurement object (4) from a time-of-flight difference of the Terahertz radiation reflected on a first boundary surface (4b, 4c) of the wall (4a) of the measurement object (4) and the Terahertz radiation reflected on a second boundary surface (4b, 4c) of the wall (4a), where in the beam path (5) of the at least one transmitter and receiver unit (2) an adjustable optical unit (7) including a reflector is arranged, where a surface of the reflector is designed to deflect the irradiated Terahertz radiation and/or the Terahertz radiation reflected from the respective boundary surface (4b, 4c) for adjusting the optical axis (C) of the transmitter and receiver unit (2).

(Continued)

Figure 5A:
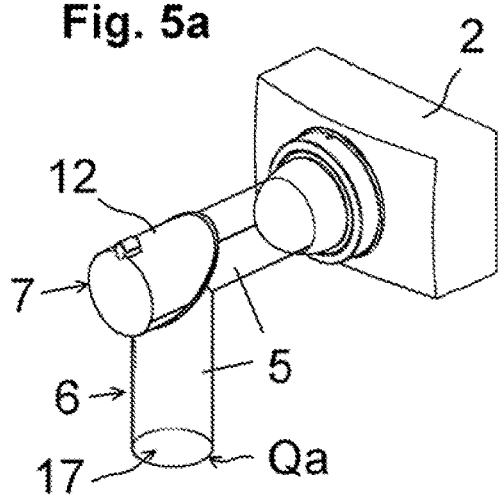

Hereby, according to the invention, it is provided that the reflector is designed to be deformable so that a beam cross-section of the irradiated Terahertz radiation can be modified in a focusing plane (17) lying downstream from the reflector in the radiation direction of the irradiated Terahertz radiation, the focusing plane being adjustable by deforming the reflector.

16 Claims, 4 Drawing Sheets

(58) Field of Classification Search
CPC ........... G01N 21/3563; G01N 21/3581; G01N 21/8422
USPC ......................................................... 356/503
See application file for complete search history.

(56) References Cited

FOREIGN PATENT DOCUMENTS

DE    102015122205    6/2017
WO      2016139155    9/2015

OTHER PUBLICATIONS

German Office Action for DE102019108299.4.
Michael Eickenberger et al. "Deformable mirror for wavefront shaping of infrared radiation" Optic letters, United States, May 1, 2018, pp. 2062-2065.

* cited by examiner

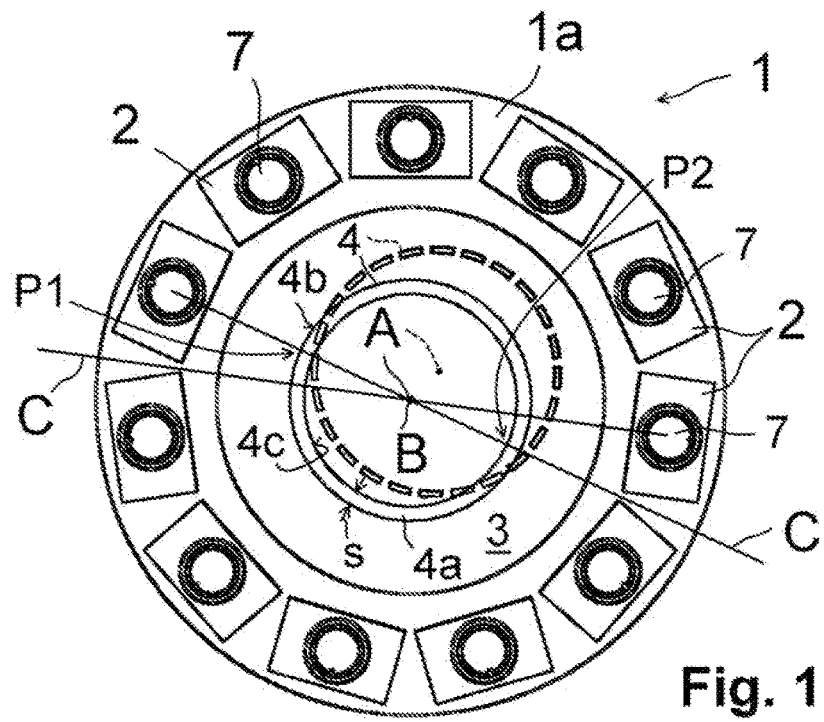
Fig. 1
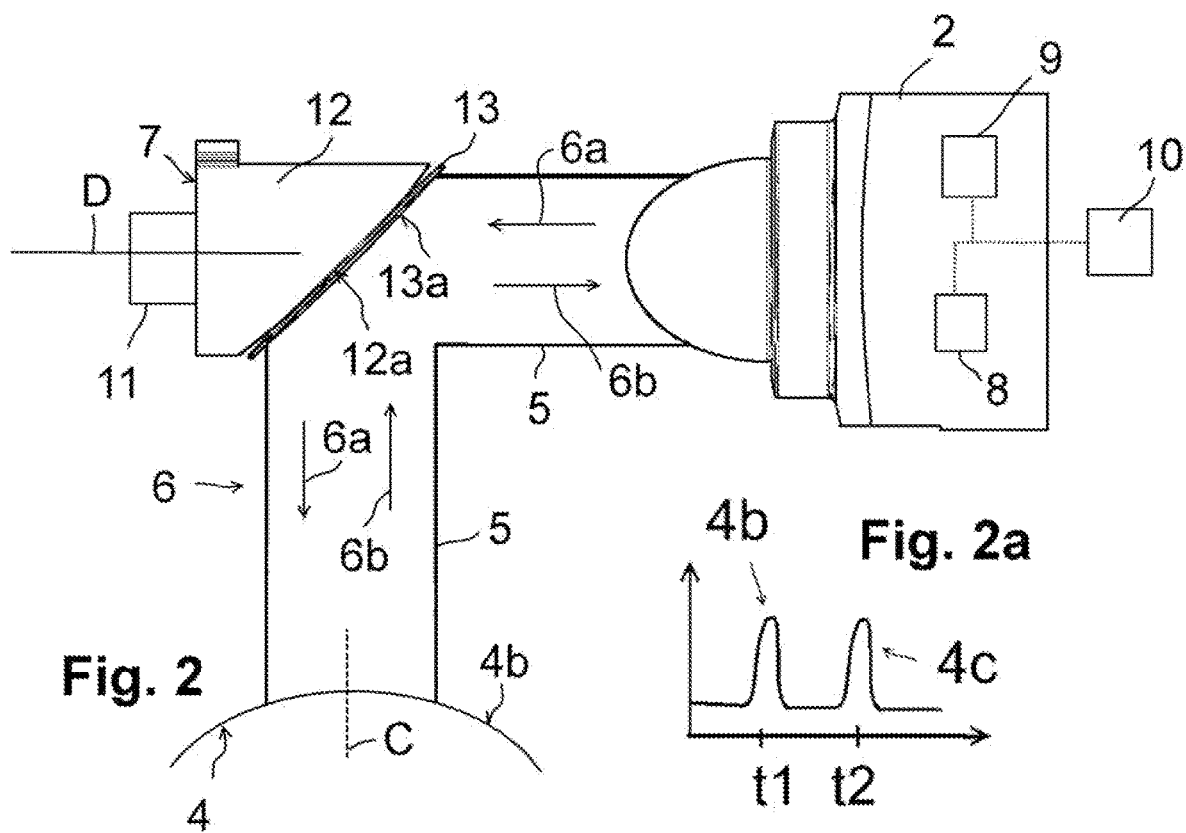
Fig. 2
Fig. 2a

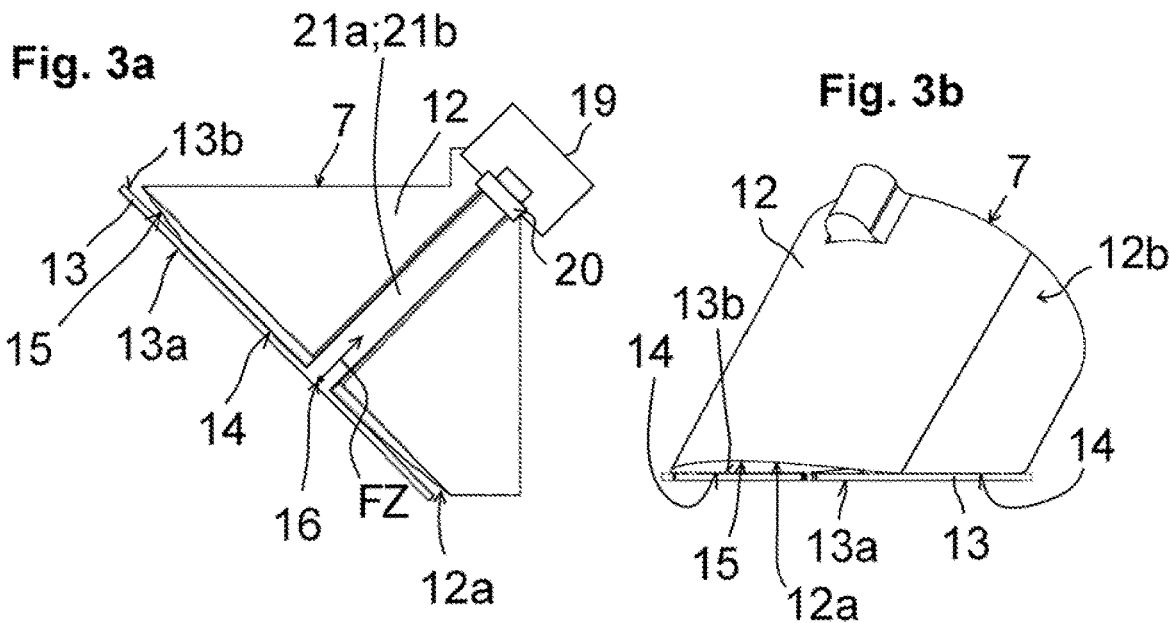

THz MEASURING DEVICE AND THz MEASURING METHOD FOR DETERMINING A LAYER THICKNESS OR A DISTANCE OF A MEASUREMENT OBJECT

CROSS REFERENCE TO RELATED APPLICATIONS

This application is a U.S. national stage application under 35 U.S.C. § 371(b) of International Application No. PCT/DE2020/100188 filed Mar. 13, 2020, which claims priority to the German Patent Application No. 102019108299.4 filed on Mar. 29, 2019, the disclosures of both of which are hereby expressly incorporated by reference in their entirety.

The invention relates to a THz measuring device and a THz measuring method for determining a layer thickness or a distance of a measurement object.

For determining a layer thickness of a measurement object it is known to irradiate Terahertz radiation along an optical axis onto the measurement object using a transmitter and receiver unit. Hereby, the measurement object is made of a material transparent for Terahertz radiation, e.g. plastics, which has a refraction index for Terahertz radiation markedly higher than for air or vacuum. Consequently, part of the irradiated Terahertz radiation is reflected upon entering the material layer of the measurement object and part of it penetrates the material layer. A further part of the Terahertz radiation entering the material layer will also be reflected on a subsequent boundary surface, e.g. a rear side of the material layer upon transitioning to air or vacuum respectively, and the other part will continue to propagate in the vacuum or in the air respectively. This way a part of the Terahertz radiation will be reflected and another part will be transmitted on each boundary surface.

The reflected Terahertz radiation can be detected using a Terahertz receiver in the transmitter and receiver unit and thereupon a measuring signal in temporal resolution can be put out. Hereby, in temporal progression, measuring peaks will appear for each reflection on one of the boundary surfaces. A run-time for a double pass through the material layer ca be deduced from the time-of-flight difference between adjacent measuring peaks, and, from this, the layer thickness of the material layer at the investigated spot of the measurement object can be deduced.

When hollow cylindrical measurement objects, for example plastic pipes, are measured, it is possible thoroughly measure the measurement object if the irradiated Terahertz radiation is suitably adjusted. Hereby, the Terahertz radiation will penetrate the wall or, respectively, the material layer of the measurement object at two opposing positions so that the layer thicknesses of the measurement object at the two opposing measuring positions can be simultaneously determined from the measuring peaks in the measuring signal. At the same time, the distance between the two measuring positions and, from this, a diameter of the measurement object can be estimated from the run-time of the reflected Terahertz radiation.

In order to achieve a reliable thorough measurement of the hollow cylindrical object, the irradiated Terahertz radiation must be focused in such a way that the Terahertz radiation reflected on the boundary surfaces will be reflected, as completely as possible, back to the transmitter and receiver device where it can be detected by the Terahertz receiver. This is usually achieved in that the Terahertz radiation is focused by means of an optical unit, for example a mirror and/or a lens, onto a central axis of the hollow cylindrical measurement object. Thus, the optical axis of the transmitter and receiver unit intersects this central axis. This way the irradiated Terahertz radiation will be aligned approximately perpendicular to the boundary surfaces of the hollow cylindrical measurement object so that is can be reflected back exactly perpendicularly. This ensures that a large portion of the Terahertz radiation irradiated onto the measurement object will be reflected back to the transmitter and receiver device and to be detected there. However, back reflection can be attained used even an unfocused, e.g. collimated beam path, which will then have a reduced signal strength.

THz measuring devices capable to determining a layer thickness and distances in accordance with this principle are used, in particular, for contact-less testing of the quality of a measurement object after being manufactured, in that the measurement object is guided via a suitable transport means directly towards the THz measuring device at the end of or within a production line. Hereby, the device may comprise one or more such transmitter and receiver devices which are then arranged on a support in a circular pattern so as to allow the layer thickness or, respectively, there from, a diameter of the measurement object to be determined across part of the circumference or fully circumferentially.

Hereby, however, it has become apparent that with such a continuous monitoring of the measurement objects, in particular the hollow cylindrical measurement objects, in the production line, inaccuracies in the positioning of the measurement object relative to the THz measuring device may occur. This will lead to the irradiated Terahertz radiation being no longer focused exactly onto the central axis of the hollow cylindrical measurement object. Thus, the irradiated Terahertz radiation will impact the boundary surfaces no longer exactly perpendicularly and will, likewise, no longer be reflected exactly perpendicularly back to the transmitter and receiver unit. This markedly reduces the signal strength or amplitude strength respectively of the measuring signal. Thus, an exact determination of the layer thickness or, respectively, the diameter of the hollow cylindrical measurement object will be no longer guaranteed.

In order to avoid this, a THz measuring device is known from the document DE 10 2015 122 205 A1 which is capable of adjusting the optical axis of the transmitter and receiver unit in an oscillating manner thereby optimising the signal strength or amplitude strength respectively of the reflected Terahertz radiation. A disadvantage hereof is the fact that only the optical axis of the transmitter and receiver device can be set to be perpendicular to the boundary surfaces of the measurement object. However, since the irradiated Terahertz radiation usually has a parallel beam path with an approximately circular beam cross-section, the irradiated Terahertz radiation will not be fully reflected back to the transmitter and receiver unit due to the curvature of the boundary surfaces of the measurement object. Thus, for example, Terahertz radiation being at the edge of the parallel beam path will exhibit an angle of incidence unequal to 90° due to the curved boundary surface of the measurement object so that the reflected Terahertz radiation is reflected back not perpendicularly and, therefore, no longer runs parallel to the optical axis of the transmitter and receiver unit. This will again lead to a reduction in signal strength or amplitude strength respectively of the reflected Terahertz radiation and, therewith, to an imprecise determination of the layer thicknesses.

A further THz measuring device is shown in the document WO 2016/139,155 A1, wherein a focusing of the irradiated Terahertz radiation onto the central axis of the measurement object by means of lenses as optical unit is provided. Hereby, the lenses focus the Terahertz radiation irradiated from the transmitter and receiver unit in linear fashion onto a central longitudinal axis of the measurement object.

A disadvantage hereof is the fact that the optical unit or the lenses respectively are pre-determined in their shape and position so the optical axis and the linear focus, too, are pre-determined precisely. Now, if the measurement object in the THz measuring device should exhibit an unexpected offset or unexpected flat areas or oval areas or interior faults occur in certain parts, it is not possible to react there upon and the layer thickness measurement will become imprecise.

It is therefore the object of the invention to specify a THz measuring device and a THz measuring method by means of which a secure and precise determination of a layer thickness and/or a distance of a measurement object can be achieved.

This task is solved by a THz measuring device according to claim 1 as well as a THz measuring method according to the further independent claim. Preferred further developments are described in the sub-claims.

Hereby, the THz measuring device according to the invention is provided, in particular, for carrying out the THz measuring method according to the invention, and the THz measuring method according to the invention will be carried out, in particular, applying or utilizing the THz measuring device according to the invention.

Thus, a THz measuring device (Terahertz measuring device) for measuring a layer thickness of a wall of a measurement object and/or a distance between boundary surfaces of a measurement object is provided, comprising at least one transmitter and receiver unit for irradiating Terahertz radiation onto the measurement object and for detecting Terahertz radiation reflected on the measurement object, where, according to the invention, a deformable reflector, for example a mirror, is arranged in the beam path of the transmitter and receiver unit by means of which a beam cross-section of the irradiated Terahertz radiation for testing the measurement object can be changed in a focusing plane lying downstream from the reflector in the direction of the beam, where the focusing plane can even be adjusted by deformation of the reflector. Hereby, the direction of irradiation extends starting at the transmitter and receiver unit towards the reflector and subsequently to the measurement object so that the beam cross-section can be changed in the area of the measurement object by means of the reflector according to the invention, whereby the focusing plane can hereby be adjusted to a wall of the measurement object but also into the measurement object, in particular into a central axis of the measurement object, or outside the measurement object, e.g. in the infinite, for adjusting a collimated beam path.

By virtue of this alone, advantageously, it is possible to adapt the beam shape, in particular the beam cross-section in the focusing plane, purposefully to the object to be measured or the respective measuring application. Hereby, it is taken into consideration that the re-reflected Terahertz radiation is used to determine the layer thickness or the distance respectively in the transmitter and receiver unit and that re-reflection towards the transmitter and receiver unit is most efficient when the irradiated Terahertz radiation hits the boundary surfaces at the position to be measured at a perpendicular angle. Hereby, in particular, first surfaces or outer surfaces respectively and second surfaces or interior surfaces respectively of the measurement object serve as boundary surfaces. Thus, when the Terahertz radiation penetrates a hollow cylindrical measurement object there will be at least four boundary surfaces on which reflection occurs.

Thus, by virtue of a purposeful change of the beam cross-section in the focusing plane as well as by suitable positioning of the focusing plane itself, it is possible to attain that the irradiated Terahertz radiation hits the respective boundary surfaces at a perpendicular angle and, consequently, Terahertz radiation reflected thereon can be detected by the transmitter and receiver unit at a high signal strength. This makes it possible to examine even measurement objects the surfaces of which contain faults, e.g. flat areas or oval areas, and/or which lie eccentrically from the axis of symmetry of the THz measuring device on which the focusing plane is usually aligned. Hereby, it is possible to achieve a purposeful adaptation to the object to be measured, almost irrespective of how the measurement object is positioned in the THz measuring device.

In order to deform the reflector it is preferably provided that the optical unit comprises a support having at least two edges lying opposite on the support, whereby the reflector upon exertion of a traction force on the reflector and/or a pressure force on the at least two edges is braced against the at least two edges in such a way that the reflector deforms so that the surface of the des reflector, upon which the Terahertz radiation impinges, also deforms. Hereby, it is possible to achieve in a simple manner a deformation, in particular arching of the reflector between the two edges, to suitably adapt the beam path.

To that end, preferably, it is provided that the rear side of the reflector rests against the at least two edges of the support and, when a traction force is exerted on the rear side of the reflector, the reflector braces against the at least two edges at a pull point located between the at least two edges in such a way that the reflector deforms, whereby an inwardly curved recess, in particular a concave trough, is formed between the two edges so that, when a traction force is exerted on the pull point, the rear side of the reflector approaches the inwards curved recess by way of deformation. This way, by exerting a traction force on the reflector, it is possible to purposefully achieve a deformation of the reflector adapted to the recess. Hereby, the recess also defines a limit position for the reflector since the reflector can no longer continue to deform after resting against the recess despite any traction force still acting.

Preferably, it is further provided that the at least two edges form part of a forward face of the support. This results in the edges being firmly affixed to the support and, there with, easy to manufacture. Alternatively, however, it may be provided for the at least two edges to be formed on profiles which are loosely arranged on the support of the optical unit, whereby the edges press against the rear side of the reflector when the respective profile is moved so that the reflector bracing against the at least two edges will be deformed.

Thus, the support may also include movable edges against the reflector rests. This may enable a deformation of the reflector in several variants; by exerting a traction force on the reflector and/or a pressure force on the edges. Hereby, a variable adjustment of the beam path or, respectively, the beam shape of the Terahertz radiation can be guaranteed.

Hereby, preferably, the edges of the support des are formed in such a way that the surface of the reflector, when a traction force and/or a pressure force is exerted, assumes a uni-axially curved, or respectively, singly curved shape (comp. singly curved concave mirror) or a multi-axis curved shape, in particular three-dimensionally curved, shape (comp. e.g. parabolic mirror), which may be symmetrical or asymmetrical and provides for the forming or a corresponding beam cross-section. Thus, it is possible to purposefully adapt the curvature and therewith the beam shape to the respective application, e.g. the object to be measured.

It is also possible to adjust the curvature or the beam shape respectively by the path of the edges against the reflector is braced, whereby, preferably, these at least two edges run in parallel across a certain length. However, an angle between the edges may be provided. Hereby, the alignment of the edges relative to the support may be chosen symmetrical or asymmetrical, i.e. twisted in relation to the axis of symmetry of the support. This way, too, it is possible to variably determine the formable curvature of the reflector and therewith the resulting beam path.

Preferably, it may further be provided for the material of the reflector to be strengthened or weakened in certain areas for adjusting a homogenous and/or evenly curved shape of the surface when a traction force and/or a pressure force is exerted. This way, advantageously, it is possible to purposefully adjust a bending line of the reflector, i.e. the spatial deforming characteristics upon exertion of the traction force or the pressure force.

Hereby, preferably, it is provided for the reflector to be designed as a metal sheet or a plastic support, each being capable of undergoing elastic deformation, and being coated or metallized respectively with a metallic material or being electroplated so as to create a reflecting surface. This makes it possible to provide a flexible mirror in a simple manner by means of which beam shapes can be generated purposefully and, at the same time, a preferably total reflection of the Terahertz radiation can be attained.

Preferably, it is further provided that the traction force and/or the pressure force can be exerted by an actuator. This can enable an automated adjustment of the beam cross-section when the actuator is electrically controlled. Hereby, preferably, the actuator is designed as servo motor, linear action piezo drive, magnetic drive or bimetallic drive for exerting a traction force on the reflector and/or a pressure force on the edges.

Hereby, preferably, according to one embodiment, it is provided for the actuator to be designed as a servo motor which is configured to rotate a socket, the socket being screwed onto a threaded pin coupled to the rear side of the reflector in such a way that the threaded pin can be pulled at a traction force by rotating the socket. Thus, it is possible to purposefully deform the reflector with little space required.

Preferably, it may further be provided that the beam cross-section of the irradiated Terahertz radiation can be modified in a focusing plane depending on the deformation of the reflector symmetrically or asymmetrically between a round beam cross-section and an approximately linear beam cross-section. This makes it possible to carry out a purposeful interference depending on the application by means of which an efficient re-reflection towards the transmitter and receiver device can be guaranteed. For an initial adjustment, for example, a circular beam cross-section may be sufficient to determine the orientation of the optical axis. Following this determination the beam cross-section may then be adapted in the focusing plane as suitable depending on the surface characteristics and the type of the measurement object, so as to attain a high signal strength of the reflected Terahertz radiation at the transmitter and receiver unit.

For example, it may be provided for the focusing plane to be adjustable in the THz measuring device by adjusting the optical unit to a central axis of an object to be measured, preferably a pipe-shaped measurement object. Hereby, an optimized complete measuring of the measurement object can be achieved, where, due to the focusing, preferably approximately linear focusing in the central axis, opposing walls of the pipe-shaped measurement object can be equally covered at a perpendicular incidence of the Terahertz radiation.

Preferably, it is further provided that the optical unit rotates about an axis of rotation for adjusting the optical axis of the respective transmitter and receiver unit. This way, an adjustment of the optical axis can be carried out in a simple manner, if the measurement object is arrange, for example, eccentrically in the THz measuring device, for example due to pipe position errors, in particular with swinging or sagging pipes.

Thus, in the THz measuring method according to the invention, it is provided to adapt the beam cross-section of the irradiated Terahertz radiation prior to the measurements, during the measurements or in-between the measurements by deforming the reflector deflecting the irradiated Terahertz radiation, to adjust the beam shape and the focusing plane accordingly. Hereby, the adaptation may be carried out adaptively during the measurement or once only prior thereto. For that purpose, further sensors may be employed covering the measurement object and determining, for example, faults, e.g. flat areas or oval areas, in the measurement object and thereupon adapt the beam shape by means of deforming the reflector and/or the optical axis by rotating the optical unit about the axis of rotation.

However, it is also possible to carry out a periodical adjustment of the beam cross-section and/or the optical axis during the measurement with subsequent evaluation of the measuring signal. Depending on the resulting change in the measuring signal, for example improved signal strength, a determination of the new beam cross-section can be made. Hereby, the beam cross-section may be adjusted symmetrically, in particular round, elliptically, approximately linearly, lenticular, or even asymmetrically.

In order to allow for a nearly fully circumferential inspection it is preferably provided that several transmitter and receiver units are arranged circularly on a measuring support of the THz measuring device the optical axes of which can be directed towards the measurement object.

Figure 6A:
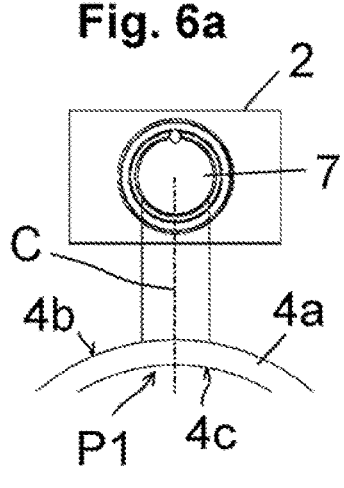
Figure 6B:
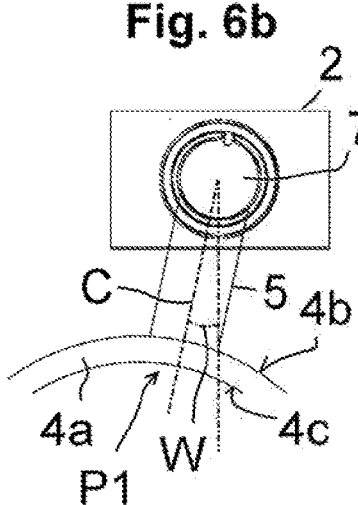
Figure 6C:
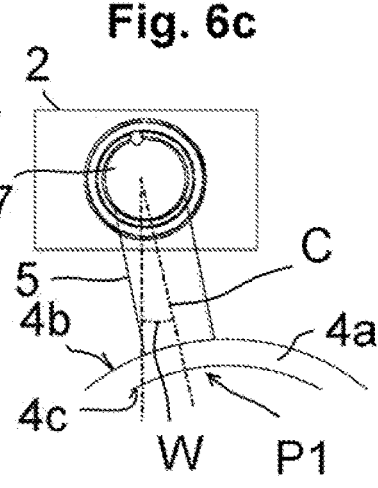
Figure 6D:
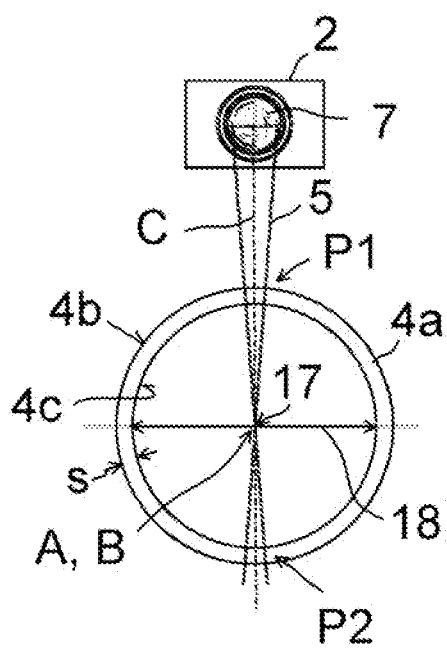
Figure 6F:
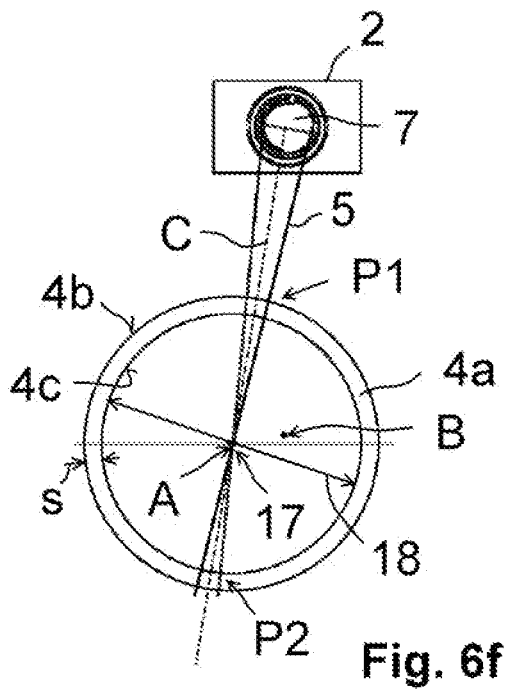
Figure 6E:
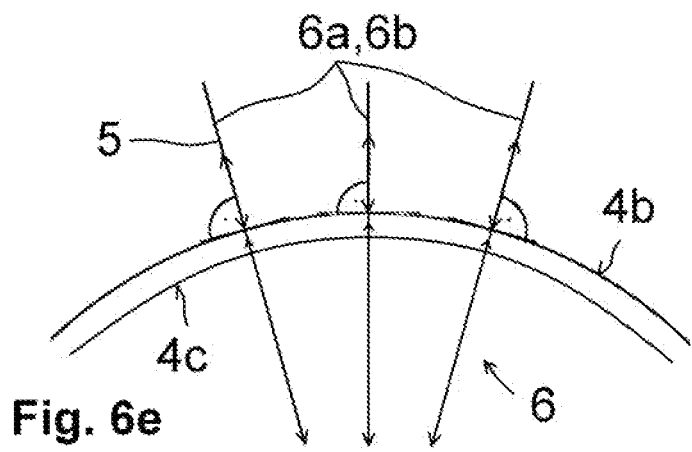
Figure 7:
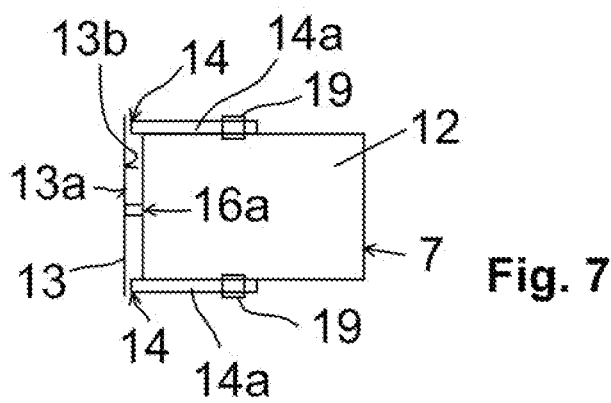

The invention is further illustrated in the following by means of figures. It is shown in:

FIG. 1 a THz measuring device including several transmitter and receiver units for determining a layer thickness of a measurement object;

FIG. 2 a section of a beam path of a single transmitter and receiver unit from FIG. 1;

FIG. 2a a temporal progression of a measuring signal;

FIG. 3a-c detailed views of an optical unit having a reflector in the beam path of the transmitter and receiver unit according to FIG. 2;

FIG. 4a-c different settings of the reflector in the optical unit;

FIG. 5a-d beam cross-sections for the beam path according to FIG. 2 resulting from the setting of the reflector according to FIGS. 4a-c;

FIG. 6a-f adjustment options of the beam path as well as of the optical axis; and FIG. 7 a detailed view of an alternative embodiment of an optical unit with a reflector.

According to FIG. 1, a THz measuring device 1 is provided including a plurality of transmitter and receiver units 2 which are arranged in a circular pattern around a measuring aperture 3 and configured to generate and emit Terahertz radiation 6 as well as to detect the same. According to this embodiment example, the THz measuring device 1 comprises eleven transmitter and receiver units 2 which are attached to a measuring support 1a. In the measuring aperture 3a measurement object 4 is arranged whose longitudinal axis or central axis A respectively is aligned perpendicular to the drawing plane. According to this embodiment example, the measurement object 4 is a hollow cylindrical plastics pipe having a cylindrical or tube-shaped wall 4a which exhibits a certain wall thickness or layer thickness respectively. The THz measuring device 1 serves to measure the measurement object 4, whereby the THz measuring device 1, to that end, may be arranged, for example, directly at the end of the line of the production process, e.g. downstream from an extruder. Thus, the manufactured measurement object 4 is subsequently guided along its longitudinal direction through the measuring aperture 3 in the THz measuring device 1.

Hereby, each transmitter and receiver unit 2 comprises a Terahertz transmitter 8, as indicated in FIG. 2, for irradiating Terahertz radiation 6a towards the measurement object 4, in particular within a frequency range between 0.01 THz and 50 THz, preferably 0.05 THz and 20 THz, in particular 0.1 THz and 10 THz. Further, the transmitter and receiver unit 2 comprises a Terahertz receiver 9 capable of detecting reflected Terahertz radiation 6b in the same frequency range. The controlling of the transmitter and receiver unit 2 happens in a controller unit 10 which is either associated with the respective transmitter and receiver unit 2 and controlling the respective transmitter and receiver unit 2 and/or arranged centrally in the THz measuring device 1 and centrally controlling all transmitter and receiver units 2 of the THz measuring device 1.

To allow for an exact measuring of the measurement object 4 the measurement object 4 is guided ideally centrally through the measuring aperture 3. Thus, the central axis A of the measurement object 4 lies on an axis of symmetry B of the THz measuring device 1. Adapted hereto, optical axes C of the transmitter and receiver units 2 can be adjusted as usual such that these meet in the axis of symmetry B and, there with, also in the central axis A. As shown by dotted lines in FIG. 1, however, the measurement object 4 may be located eccentrically inside the THz measuring device 1, i.e. the axis of symmetry B of the THz measuring device 1 no longer lies on the central axis A of the measurement object 4. Thus, there is a positioning error as it may occur, for example, due to sagging of the measurement object 4 or, respectively, even due to vibration of the flexible material of the freshly manufactured measurement object 4.

In order to still allow for an exact measuring of the measurement object 4 even in this case, it is provided, according to FIG. 2, that Terahertz radiation 6a irradiated from the transmitter and receiver unit 2 can be deflected via an optical unit 7. Thus, by means of the optical unit 7, which is arranged in the beam path 5 of the respective transmitter and receiver unit 2, it is possible to purposefully align an optical axis C of the respective transmitter and receiver unit 2 according to the position of the measurement object 4 within the measuring aperture 3. Thus, a beam path 5 of the irradiated Terahertz radiation 6a is purposefully influenced to guide this towards the measurement object 4 at a certain beam angle W (see FIGS. 6a, b, c).

This makes it possible for the optical axes C of all transmitter and receiver units 2 of the THz measuring device 1 to be aligned on the central axis A of the measurement object 4, even when this does not lie on the axis of symmetry B of the THz measuring device 1. Moreover, as illustrated in the following, the optical unit 7 can be used to focus the beam path 5 of the respective transmitter and receiver unit 2 onto the central axis A of the measurement object 4 or any arbitrary other points within the THz measuring device 1, for example, onto a first surface 4b or, respectively, the exterior surface of the measurement object 4. It is even possible to focus to a point in the far distance to "infinity" so as to create a nearly parallel beam path 5. To that end the optical unit 7 according to this embodiment is designed as follows:

First of all, for adjusting the beam angle W, the optical unit 7 may be rotated about an axis of rotation D preferably lying parallel to the axis of symmetry B of the THz measuring device 1. This allows the optical axis C of the respective transmitter and receiver unit 2 to be purposefully adapted to achieve, for example, that the optical axes C of all transmitter and receiver units 2 intersect roughly in the central axis A of the measurement object 4, as described above. Hereby, the rotation of the optical unit 7 about the axis of rotation D may be carried out e.g. via a servo motor 11, schematically indicated in FIG. 2, collaborating with a support 12 of the optical unit 7.

Further, according to the FIGS. 3a and 3b, it is provided for a preferably circular reflector 13, e.g. a mirror, to be arranged on a forward face 12a of the support 12 of the optical unit 7. Hereby, the reflector 13 is designed to be fully reflective for Terahertz radiation 6, 6a, 6b. Thus, the Terahertz radiation 6a irradiated from the transmitter and receiver unit 2 and also back towards it is fully deflected on a surface 13a of the reflector 13 depending on the respective angle of incidence to a corresponding angle of reflection.

Furthermore, the reflector 13 is designed to be flexible so that, besides the reflection of the Terahertz radiation 6, 6a, 6b on the surface 13a of the reflector 13, a bundling and there with a focusing of the irradiated Terahertz radiation 6a can be attained. Hereby, the transmitter and receiver unit 2 emits parallel Terahertz radiation 6a ab which upon passing the 13 is deflected in accordance with the modifiable shape or, respectively, the curvature of the surface 13a of the reflector 13. At the same time, Terahertz radiation 6b reflected back from the measurement object 4, which hits the reflector 13, is deflected according to the set shape or, respectively, the curvature of the surface 13a of the reflector 13 (see FIG. 2).

Hereby, according to a first embodiment, a purposeful deformation of the reflector 13 is achieved in that the rear side 13b of the reflector 13 rests against two edges 14 of the length L running parallel to one another and braces against them on both sides. Between the edges 14 the forward face 12a of the support 12 is curved inwards in a concave manner so that a trough 15 is formed between the edges 14, as shown in the FIGS. 3a, 3b, 3c as well as FIGS. 4a, 4b and 4c. This can be achieved, for example, in that a cylindrical body having a concave forward face 12a is subsequently flattened on both sides so that parallel flats 12b are created at the upper sides parallel edges 14 are created that laterally limit the trough 15. This is represented schematically in a top view in FIG. 3c.

In an unloaded condition, shown in the FIGS. 3a, 3b and 4a, the rear side 3b of the reflector 13 merely rests on the edges 14 thereby exhibiting a planar surface 13a. This leads to the beam path shown already in FIG. 2 wherein the irradiated Terahertz radiation 6a is aligned in parallel even after being reflected on the surface 13a of the reflector 13. Thus, in this condition there is no focusing of the irradiated Terahertz radiation 6a and also the beam path of the reflected Terahertz radiation 6b remains parallel.

However, when a traction force FZ directed rearwards in relation to the optical unit 7 is exerted on the reflector 13 via a pull point 16 (see FIG. 3a) the surface 13a of the reflector 13 will curve concavely inwards. Thus, the rear side 13b of the reflector 13 will be pulled inwards in the direction of the concavely shaped trough 15 of the support 12 while the reflector 13 braces on the edges 14 here running in parallel. This is shown in FIG. 4b for a certain traction force FZ. Terahertz radiation 6a, 6b striking the surface 13a of the reflector 13, which is now curved inwards, will be deflected in accordance with the curvature. This way, Terahertz radiation 6a irradiated from the transmitter and receiver unit 2 can be focused.

Figure 5B:
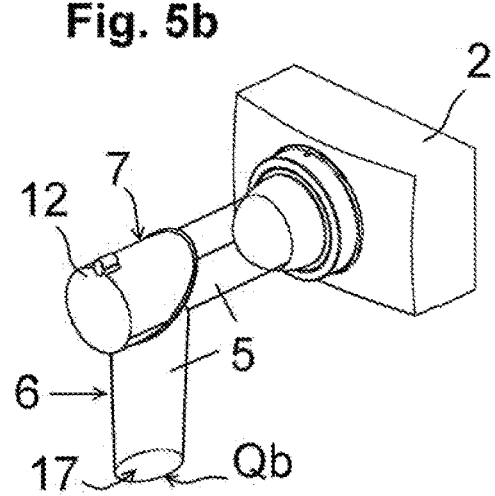
Figure 5C:
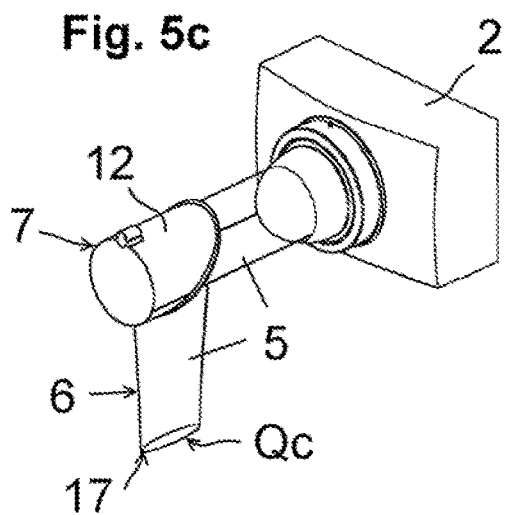
Figure 5D:
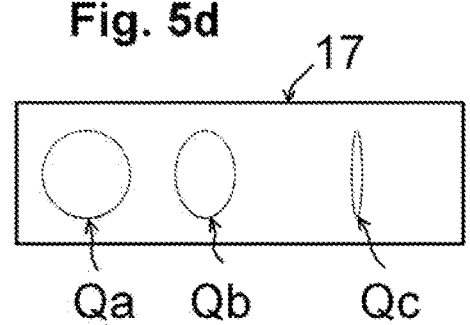

As a consequence hereof, the beam path 5 downstream from the reflector 13, i.e. between the reflector 13 and the measurement object 4, is no longer parallel. This is shown in FIG. 5b by way of example. In contrast to a parallel beam path 5 in the case of a planar surface 13a (s. FIG. 4a), where the beam cross-section Qa is circular according to FIG. 5a, in the case of a slightly curved surface 13a according to FIG. 4b there will be an elliptical cross-section Qb of the beam path 5 which will then be focused downstream from the reflector 13 in a focusing plane 17.

When an even stronger traction force FZ is exerted on the pull point 16 on the reflector 13 then, according to the embodiment in FIG. 4c, the rear side 13b of the reflector 13 will lay itself nearly completely into the trough 15 which is limited by the two edges 14. This will result, for example, in the beam path shown in FIG. 5c having a very narrow elliptical cross-section Qc in the focusing plane 17 which extends almost linearly. The different beam cross-sections Qa, Qb, Qc in the focusing plane 17 are compared face to face again in FIG. 5d.

Owing to the shape of the trough 15 or, respectively, the position and the path of the edges 14 on which the reflector 13 braces when a traction force FZ is exerted, it is possible to purposefully adjust in what way the reflector 13 will deform and, there with, how the Terahertz radiation 6a, 6b will be deflected or focused respectively. Hereby, the arrangement of the edges 14 and/or the concave curvature of the trough 15 does not necessarily have to be symmetrical. The flats 12b according to FIG. 3c may, for example, be angled relative to one another or angled relative to the axis of symmetry of the cylindrical body (dotted edges 14 in FIG. 3c). Hereby, also, given a suitable design of the edges 14 or the trough 15 respectively, an asymmetrical deformation of the reflector 13 upon exertion of a traction force FZ may be provided. Thereby, pre-defined beam paths 5 between the reflector 13 and the measurement object 4 and bema cross-sections Qa, Qb, Qc for aimed focusing can be purposefully generated by means of which the Terahertz radiation 6a will be irradiated along the optical axis C onto the respective measurement object 4.

According to a second embodiment, schematically represented in FIG. 7, it may also be provided to affix the reflector 13 on the support 12 on a fixed point 16a. At opposite sides on the support 12 two flat profiles 14a are arranged, whose edges 14 of the length L (perpendicular to the drawing plane) can be pressed against the rear side 13b of the reflector 13. Arranging the edges 14 opposite the fixed point 16a causes the outer sides of the reflector 13 to be pushed upwards by the pressure force FD. This results in the surface 13a of the reflector 13 curving—just like in the other embodiment—concavely inwards while the rear side 13b of the reflector 13 braces against the edges 14 of the profiles 14a.

A combination of both embodiment is conceivable also. Thus, the fixed point 16a of the second embodiment may be formed by holding or fixing respectively the "pull" point 16 from the first embodiment. By means of shifting the profiles 14a it is possible to achieve—as described in connection with the second embodiment—a deformation of the reflector 13 by double-sidedly exerting a pressure force FD on the rear side 13b via the two edges 14. Additional pulling the pull point 16 is possible also, whereby the pull point 16 will then be moved opposite to the 14a.

Otherwise the profiles 14a of the second embodiment can be held or fixed respectively so that the rear side 13b of the reflector 13 can brace against the edges 14 of the profiles 14a when a traction force FZ is exerted on the "pull" point 16a which is then pulled. Between the profiles 14a the support 12 of the second embodiment will then, accordingly, have to be provided with a trough 15. Here, too, a movement of the profiles 14a opposite the traction direction of the fixed point 16a may be provided.

In order to enable the deformation of the reflector 13 in both embodiments this is designed, for example, as a thin metal sheet which is coated or metallized respectively with a metallic material. Further, a galvanized plastic support may serve as reflector 13. The coatings are to be selected accordingly such that they can guarantee total reflection of the respective Terahertz radiation 6a, 6b. The materials are to be adapted accordingly such that the reflector 13 can be elastically deformed while maintaining a long life cycle.

In order to enable a purposeful deformation of the reflector 13 or, respectively, to adjust a defined mechanical bending line of the reflector 13, the reflector 13 may be purposefully strengthened or weakened in certain areas. This may be achieved, for example, by means of a suitable selection of the material used or a material thickness. As a consequence thereof, when the traction force FZ or the pressure force FD is exerted, the reflector 13 will deform less or more in certain areas, thereby allowing, for example, a homogenous or, respectively, consistent deformation and there with a purposeful focusing of the beam path to be attained. Thereby, it is possible, for example to adjust the shape of a sphere or a parabolic cylinder so as to achieve a corresponding deflection of the Terahertz radiation 6, 6a, 6b.

As a means to exert the traction force FZ onto the reflector 13, for example, a small actuator 19 may be used which is firmly coupled to the support 12. The actuator 19 may, for example, actuate a socket 20 by rotating it, the socket being screwed onto a threaded pin 21a which is coupled to the rear side 13b of the reflector 13 but not to the support 12. By rotating the socket 20, e.g. via a small servo motor as actuator 19, the threaded pin 21a is pulled backwards and, thereby, a traction force F is exerted. Further, in the alternative, magnetic drives, piezo drives, or bimetallically acting drives can be used as linear actuators 19 which, likewise, can exert a traction force FZ on the rear side 13b via a pin 21b mounted on the rear side 13b of the reflector 13. This can provide a simple adjustment taking up little space because even very small components can effect a curving of the reflector 13. It is also possible to press the edges 14 of the profiles 14a against the rear side 13b of the reflector 13 via such actuators 19, e.g. linear servo motors, magnetic drives, piezo drives, or bimetallically acting drives, so as to exert the pressure force FD via the edges 14 and, thereby, to curve the reflector 13.

Thus, by virtue of a suitable adjustment of the optical unit 7 or the curvature of the reflector 13 respectively, it is possible to purposefully determine where the optical axes C of adjacent transmitter and receiver units 2 intersect and with what beam cross-section Qa, Qb, Qc the irradiated Terahertz radiation 6a will impinge in a variably adjustable focusing plane 17. This makes it possible, with suitable deformation of the reflector 13, to purposefully place the focusing plane 17 on the central axis A of the measurement object 4 and, hereby, for example, to achieve approximately linear focusing along the central axis A even when the measurement object 4 is located not centrally with respect to the axis of symmetry B of the THz measuring device 1. It is even possible to purposefully focus on one of the walls 4a of the measurement object 4 in order to, for example, carry out a distance measurement. However, it is also possible to make an initial adjustment by first setting a collimated beam path 5, i.e. focusing towards "infinity."

When focusing on the central axis A of the measurement object 4 it is possible, according to FIGS. 6d and 6e, to achieve that the irradiated Terahertz radiation 6a impinged upon a first surface 4b or, respectively, the exterior surface of the measurement object 4 at a right angle thereby also running at a right angle on an inner second surface 4c or, respectively, the interior surface of the measurement object 4 as well as on all further boundary surfaces of the measurement object 4 in the beam path 5. Hereby, it shall be assumed that the measurement object 4 has an exactly hollow cylindrical shape. If the shape is different, e.g. in the form of flat areas or oval areas in the measurement object 4, then this can be compensated by purposefully adjusting/deforming the reflector 13. Hereby, one tries to align the irradiated Terahertz radiation 6a approximately perpendicular to the boundary surfaces of the measurement object 4 at the point of incidence of the Terahertz radiation 6a so as to achieve a signal strength as high as possible.

The plastic material of the measurement object 4 is always transparent for the Terahertz radiation 6. The medium surrounding the measurement object 4, for example vacuum or air, has, for example, a refraction index of n=1, while the plastic material has a refraction index of about n=1.5. Thus, at the boundary surface transitions, i.e., in particular, at the first surface 4b and the second surface 4c of the measurement object 4, there will each occur a partial reflection of the irradiated Terahertz radiation 6a. Due to the perpendicular irradiation of the Terahertz radiation the partially reflected Terahertz radiation 6b will be reflected back to the respective surface 4b, 4c also perpendicularly. Thus, the beam path 5 of the irradiated Terahertz radiation 6a essentially coincides with the beam path of the reflected Terahertz radiation 6b. Thereby, the reflected Terahertz radiation will first reach the reflector 13 and, following total reflection, get back to the transmitter and receiver unit 2.

Due to the focusing on the central axis A of the measurement object 4 or, respectively, the perpendicular incidence of the Terahertz radiation 6a onto the boundary surfaces or surfaces 4b, 4c respectively of the measurement object 4, it is achieved that a large portion of the irradiated Terahertz radiation 6a can actually get back to the transmitter and receiver unit 2 so that a high signal strength at the Terahertz receiver 9 can be attained.

Thereby, it is possible to carry out a reliable determination of the layer thickness s of the measurement object 4 as well as a reliable determination of distances or, respectively, a diameter 18 of the hollow cylindrical measurement object 4. This is because this method allows the wall 4a of the measurement object 4 to be measured at two positions which lie exactly opposite. According to e.g. FIG. 6f or even FIG. 1, the irradiated Terahertz radiation 6a of a certain transmitter and receiver unit 2 has to impact points P1, P2 so that in the measuring signal of the Terahertz receiver 9 reflected Terahertz radiation 6b can be detected for each boundary surface transition. This is due to the fact that, ideally, the Terahertz radiation impacts perpendicularly and at a high signal strength at both impact points P1, P2.

In the measuring signal of the Terahertz receiver 9 (s. FIG. 2a) the reflected Terahertz radiation 6b effects a measuring peak that can be associated with a certain boundary surface transition. Thus, a measuring peak at a first point in time t1 is associated with, for example, the reflection on the first surface 4b of the first impact point P1, and a measuring peak at a second point in time t2 with the reflection on the second surface 4c of the first impact point P1. The temporal distance t2−t1 between the two measuring peaks then results in the run-time difference or, respectively, the time-of-flight difference of the irradiated and reflected Terahertz radiation 6a, 6b upon doubly passing the wall 4a of the measurement object 4 with the layer thickness s and a refraction index n of the layer material. The layer thickness s the follows, for example, from $s=c(t2-t1)/2n$. The same connection results when the Terahertz radiation 6a, 6b passes the second impact point P2 of the hollow cylindrical measurement object 4 so that the layer thickness s can be determined also for the second impact point P2 via the same relationship. Thus, in the case of a plurality of transmitter and receiver units 2 in the THz measuring device 1, which are arranged circumferentially around the measurement object 4 as shown in FIG. 1, a circumferential profile of the measurement object 4 can be estimated so as to monitor the quality thereof.

Further, it is also possible to determine a time-of-flight difference and there with a distance between the two boundary surface transitions for the Terahertz radiation 6b each reflected on the second surface 4c or, respectively, on the interior surface of the measurement object 4 at the first impact point P1 and at the second impact point P2. This distance corresponds to a diameter 18 of the hollow cylindrical measurement object 4. In an analogue manner, this can also be carried out for the first surface 4b or, respectively, the exterior surface of the measurement object 4 in that the time-of-flight difference for the respectively associated Terahertz radiation 6b at the first impact point P1 and at the second impact point P2 is determined. This allows both wall thicknesses s as well as distances between objects to be determined from the time-of-flight differences. Even a distance from the measurement object 4 or, respectively, a wall 4a to the transmitter and receiver unit 2 and, thereby, a shape of a flat measurement object 4 can be estimated by means of the run-time measurements.

For an optimum adjustment of the beam path 5 of the irradiated Terahertz radiation 6a, the measuring signal at the Terahertz receiver 9 may first be optimised for each transmitter and receiver unit 2 of the THz measuring device 1, with a circular beam cross-section Qa, i.e. with parallel running Terahertz radiation 6 in the beam path 5 downstream from the reflector 13 (focusing "infinite"), in that, according to the FIGS. 6a, 6b, 6c, firstly the beam angle W is adjusted at the Terahertz receiver 9 for a maximum signal strength or amplitude strength respectively of the measuring peaks. This should be the case when the optical axis C of the respective transmitter and receiver unit 2 is set to the central axis A of the measurement object 2 or, respectively, perpendicular to the surfaces 4b, 4c or boundary surfaces respectively of the measurement object 4. Hereby, it is possible in a first step, to initially compensate a displacement of the central axis A of the measurement object 4 relative to the axis of symmetry B of the THz measuring device 1 and/or deformities in the measurement object 4.

In a further step, it is possible, according to the FIG. 6d or 6f, to purposefully adapt the beam cross-section Qa, Qb, Qc as well as the focusing plane 17 by deforming the reflector 13 in order to optimise a back reflection um towards the Terahertz receiver 9 and, thereby, a signal strength.

Due to the purposeful adjustability of the beam cross-section Qa, Qb, Qc it is also possible to measure measurement objects 4 in virtually any shape and/or deformities with a high signal strength and, there with, a high degree of reliability. This allows the layer thicknesses s and wall thicknesses respectively and possibly even the distances of walls in the case of hollow measurement objects 4 to be determined, if it is guaranteed that the can be penetrated by the radiation, as described for the hollow cylindrical measurement objects 4. For this purpose it is merely necessary to ensure that the irradiated Terahertz radiation 6a impacts the respective surfaces 4b, 4c or, respectively, the boundary surfaces of the measurement object 4 approximately perpendicularly in order to be able to deduce the distances from the time-of-flight difference.

LIST OF REFERENCE NUMERALS

1 THz measuring device
1a measuring support
2 transmitter and receiver units
3 measuring aperture
4 measurement object
4a wall of the measurement object 4
4b first surface of the measurement object 4
4c second surface of the measurement object 4
5 beam path of the Terahertz radiation 6
6 Terahertz radiation
6a irradiated Terahertz radiation
6b reflected Terahertz radiation
7 optical unit
8 Terahertz transmitter
9 Terahertz receiver
10 controller unit
11 servo motor
12 support
12a forward face of the support 12
12b flat of the support 12
13 reflector
13a surface of the reflector 13
13b rear side of the reflector 13
14 edge
14a profile
15 trough
16 pull point
16a fixed point
17 focusing plane
18 diameter of the measurement object 4
19 actuator
20 socket
21a threaded pin
21b pin
A central axis of the measurement object 4
B symmetry axis of the THz measuring device 1
C optical axis
D rotational axis of the optical unit 7
FD pressure force
FZ traction force
L length of the edge 14
P1, P2 impact points
Qa, Qb, Qc beam cross-sections
s wall thickness/layer thickness
t1, t2 points in time
W beam angle

The invention claimed is:

1. A THz measuring device for measuring a layer thickness of a wall of a measurement object and/or of a distance between boundary surfaces of a measurement object, the THz measuring device comprising
a Terahertz transmitter for irradiating Terahertz radiation along an optical axis onto the measurement object and a Terahertz receiver for receiving Terahertz radiation reflected from the measurement object,
a controller configured to determine the layer thickness of the wall of the measurement object and/or a distance between boundary surfaces of the measurement object from a time-of-flight difference of the Terahertz radiation reflected on a first boundary surface of the wall of the measurement object and the Terahertz radiation reflected on a second boundary surface of the wall,
where a reflector is arranged in a beam path of the Terahertz transmitter and the Terahertz receiver, where a surface of the reflector is configured to deflect the irradiated Terahertz radiation and/or the Terahertz radiation reflected on the respective boundary surface to adjust the optical axis of the Terahertz transmitter and the Terahertz receiver,
wherein the reflector is designed to be deformable to modify a beam cross-section of the irradiated Terahertz radiation in a focusing plane lying downstream from the reflector in the beam direction of the irradiated Terahertz radiation, the focusing plane being adjustable by deforming the reflector.

2. The THz measuring device according to claim 1, further comprising a support including at least two edges lying opposite each other on the support, whereby, when a traction force is exerted on the reflector and/or a pressure force is exerted on the at least two edges, the reflector braces against said at least two edges in such a way that the reflector is deformed so that the surface of the reflector upon which the Terahertz radiation impinges, is also deformed.

3. The Terahertz measuring device according to claim 2, wherein a rear side of the reflector rests on the at least two edges of the support and, when a traction force is exerted on the rear side of the reflector, braces, at a pull point lying between the at least two edges, against the at least two edges in such a way that the reflector deforms, whereby an inwards curved recess, in particular a trough, is formed between the two edges so that, when a traction force is exerted on the pull point, the rear side of the reflector approaches the inwards curved recess while being deformed.

4. The THz measuring device according to claim 2, wherein the at least two edges are part of a forward face of the support.

5. The THz measuring device according to claim 2, wherein the at least two edges are formed on profiles which are arranged movable on the support, said edges, when the respective profile is moved, press against the rear side of the reflector with a pressure force so that the reflector bracing against said at least two edges is deformed.

6. The THz measuring device according to claim 2, wherein the edges of the support are designed such that the surface of the reflector, when a traction force and/or a pressure force is exerted, assumes a uni-axially curved shape or a multi-axis curved, in particular three-dimensionally curved, shape which may be symmetrical or asymmetrical and provides for the forming or a corresponding beam cross-section.

7. The THz measuring device according to claim 6, wherein the material of the reflector strengthened or weakened in certain areas for adjusting a homogenous and/or evenly curved shape of the surface when a traction force and/or a pressure force is exerted.

8. The THz measuring device according to claim 2 further comprising an actuator configured to exert the traction force and/or the pressure force.

9. The THz measuring device according to claim 8, wherein the actuator is designed as a servo motor, linearly acting piezo drive, magnetic drive or bimetallic drive for exerting a traction force on the reflector and/or a pressure force on the edges.

10. The THz measuring device according to claim 1, wherein the reflector is designed as a metal sheet or a plastic support, each being capable of undergoing elastic deformation, and being coated or metallized respectively with a metallic material or being electroplated to create a reflecting surface.

11. The THz measuring device according to claim 1, wherein the reflector is configured to deform symmetrically or asymmetrically to modify the beam cross-section of the irradiated Terahertz radiation in a focusing plane between a round beam cross-section and an approximately linear beam cross-section.

12. A THz measuring method for measuring a layer thickness of a wall of a measurement object and/or of a distance between boundary surfaces of a measurement object,
wherein Terahertz radiation is irradiated from a Terahertz transmitter along an optical axis onto the measurement object and Terahertz radiation reflected on boundary surfaces of the measurement object is detected by a Terahertz receiver, where a measuring signal of the detected reflected Terahertz radiation is evaluated and depending thereon a layer thickness of a wall of the measurement object and/or a distance between boundary surfaces of the measurement object is determined from a time-of-flight difference of the Terahertz radiation reflected on at least two boundary surfaces of the measurement object,
wherein prior to the measurements, during the measurements or between the measurements, a beam cross-section of the irradiated Terahertz radiation is adapted by deforming a reflector deflecting the irradiated Terahertz radiation for adjusting the beam shape and a focusing plane of the irradiated Terahertz radiation,
wherein a measurement object made of plastics generated in a manufacturing device, for example a hollow cylindrical measurement object, after being manufactured, is guided in a direction of transport constantly along a THz measuring device having at least one of the Terahertz transmitter and the Terahertz receiver according to claim 1, and inspected by at least one of the Terahertz transmitter and the Terahertz receiver for a layer thickness and/or a distance from boundary surfaces, where the optical axis of the irradiated Terahertz radiation is aligned perpendicular to a central axis of the measurement object and/or the boundary surfaces of the measurement object, where the layer thickness and/or the distance from boundary surfaces is determined by a run-measurement in which a time-of-flight difference between a first reflection of the irradiated Terahertz radiation on a first boundary surface of the wall of the measurement object and a second, subsequent in time, reflection of the irradiated Terahertz radiation on a second boundary surface is determined.

13. A THz measuring method for measuring a layer thickness of a wall of a measurement object and/or of a distance between boundary surfaces of a measurement object,
wherein Terahertz radiation is irradiated from a Terahertz transmitter along an optical axis onto the measurement object and Terahertz radiation reflected on boundary surfaces of the measurement object is detected by a Terahertz receiver, where a measuring signal of the detected reflected Terahertz radiation is evaluated and depending thereon a layer thickness of a wall of the measurement object and/or a distance between boundary surfaces of the measurement object is determined from a time-of-flight difference of the Terahertz radiation reflected on at least two boundary surfaces of the measurement object,
wherein prior to the measurements, during the measurements or between the measurements, a beam cross-section of the irradiated Terahertz radiation is adapted by deforming a reflector deflecting the irradiated Terahertz radiation for adjusting the beam shape and a focusing plane of the irradiated Terahertz radiation.

14. The THz measuring method according to claim 13, wherein the optical axis of the irradiated Terahertz radiation is adjusted by rotating the reflector for deflecting the irradiated and/or reflected Terahertz radiation to adjust the beam angle.

15. The THz measuring method according to claim 13, wherein the beam cross-section is selected, by deformation of the reflector, such that a symmetrical, in particular round, beam cross-section, elliptical beam cross-section, nearly linear beam cross-section or lenticular beam cross-section, or an asymmetric beam cross-section in the focusing plane ensues.

16. The THz measuring method according to claim 14, wherein the focusing plane is placed along a central axis of the measurement object.

* * * * *